US010378753B2

(12) United States Patent
Huang et al.

(10) Patent No.: US 10,378,753 B2
(45) Date of Patent: Aug. 13, 2019

(54) LIGHT EMITTING FAN DEVICE WITH A HYBRID OF LIGHT-REFLECTIVE AND LIGHT-GUIDING MECHANISMS (71) Applicant: GIGA-BYTE TECHNOLOGY CO., LTD., New Taipei (TW)

(72) Inventors: Shun-Chih Huang, New Taipei (TW); Tai-Chuan Mao, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/110,787

(22) Filed: Aug. 23, 2018

(65) Prior Publication Data
US 2019/0063740 A1 Feb. 28, 2019

(30) Foreign Application Priority Data

Aug. 25, 2017 (TW) .............................. 106129011 A (51) Int. Cl.
*F21V 33/00* (2006.01)
*F04D 29/00* (2006.01)
*F04D 25/06* (2006.01)
*F04D 25/08* (2006.01)
*F04D 29/32* (2006.01)
(Continued)

(52) U.S. Cl.
CPC ...... *F21V 33/0096* (2013.01); *F04D 25/0613* (2013.01); *F04D 25/08* (2013.01); *F04D 29/005* (2013.01); *F04D 29/329* (2013.01); *F21V 14/04* (2013.01); *G02B 6/0006* (2013.01); *G02B 6/0008* (2013.01)

(58) Field of Classification Search
CPC ... F21V 33/0096; F21V 14/04; G02B 6/0008; G02B 6/0006; F04D 25/08; F04D 25/0613; F04D 29/005; F04D 29/329; H05K 5/02; H05K 7/20
See application file for complete search history.

(56) References Cited

U.S. PATENT DOCUMENTS 10,082,286 B1 * 9/2018 Huang ................ F04D 25/0613
10,285,303 B2 * 5/2019 Williams ................ G06F 1/203
(Continued)

FOREIGN PATENT DOCUMENTS

| TW | M444696 | 1/2013 |
| TW | I472686 B | 2/2015 |
| TW | M500821 U | 5/2015 |

*Primary Examiner* — Joseph L Williams
*Assistant Examiner* — Jose M Diaz
(74) *Attorney, Agent, or Firm* — Muncy, Geissler, Olds & Lowe, P.C.

(57) ABSTRACT

A light-emitting cooling fan includes a base, a bracket arranged above the base, an impeller located in between the base and the bracket, a light source disposed on the bracket, a reflector disposed on a hub of the impeller and a light guiding member. The light source points downward to the hub of the impeller. The reflector is disposed underneath the light source, and configured for reflecting light from the light source in a radial direction of the hub. The light guiding member is disposed underneath the light source, and configured for receiving the light from the reflector and leading the light to travel along the radial direction of the hub to outside of the hub and then hit one of fan blades of the impeller. In this way, rotation of the impeller transfers the light into a halo visual illusion for human eyes.

8 Claims, 7 Drawing Sheets (51) Int. Cl.
*F21V 8/00* (2006.01)
*F21V 14/04* (2006.01)

(56) References Cited

U.S. PATENT DOCUMENTS

2013/0044501 A1\* 2/2013 Rudisill .................. F21V 29/70
362/398
2019/0032912 A1\* 1/2019 Xie ..................... F21V 33/0096

\* cited by examiner

LIGHT EMITTING FAN DEVICE WITH A HYBRID OF LIGHT-REFLECTIVE AND LIGHT-GUIDING MECHANISMS

CROSS-REFERENCE TO RELATED APPLICATIONS

This application claims the benefit of the filing date of Taiwan Patent Application No. 106129011, filed on Aug. 25, 2017, in the Taiwan Intellectual Property Office, the disclosure of which is incorporated herein in its entirety by reference.

BACKGROUND OF THE INVENTION

1. Field of the Invention

The present invention relates to a light-emitting cooling fan, and more particularly to a light emitting fan device with a hybrid of light-reflective and light-guiding mechanisms.

2. Description of the Related Art

Nowadays, a various of light-emitting cooling fans, especially the fans equipped with light kits, can be found in the market. One type of light-emitting cooling fan is illustrated in Taiwan Pat. No. 1472686. In this fan, the light radiating from the light source is guided in a way to one of the fan blades to create visual effects. However, to satisfy evolving customer needs, product innovation is always the only solution. Innovation is about making things better, faster, or cheaper than your competition. It drives ongoing improvements and may help unleash a new idea that changes the rules. That is to say, there is always a desire for a new light-emitting cooling fan in the markets.

SUMMARY OF THE INVENTION

Accordingly, it is an object of the present invention to provide a new light-emitting cooling fan to satisfy the aforementioned need.

Briefly described, the light-emitting cooling fan of this invention includes a base, a bracket arranged above the base, an impeller located in between the base and the bracket, a light source disposed on the bracket, a reflector disposed on a hub of the impeller and a light guiding member. The impeller is rotatably mounted on the base, and further has a plurality of fan blades arranged around the hub. The light source points downward to the hub of the impeller. The reflector is disposed underneath the light source, and configured for reflecting light from the light source in a radial direction of the hub. The light guiding member is disposed underneath the light source, and configured for receiving the light from the reflector and leading the light to travel along the radial direction of the hub to outside of the hub and then hit one of the fan blades of the impeller. In this way, rotation of the impeller will transfer the light beam into a halo visual illusion for human eyes.

Preferred embodiments of the invention may have the following additional characteristics, either alone or in combination:

The light-emitting cooling fan further includes a fixing plate mounted on the hub of the impeller. The fixing plate has a recess and a groove being in communication with the recess and extending from the recess in a radial direction of the fixing plate. The reflector is disposed within the recess. The light guiding member is embedded in the groove and has a front end heading to the reflector and a rear end pointing to outside of the fixing plate such that the reflected light from the reflector enters the front end of the light guiding member, and finally exits the rear end of the light guiding member in the radial direction of hub In one example, the reflector is a mirror while the light guiding member is a fiber optic light guide.

The light-emitting cooling fan further includes an electromagnet secured on the fixing plate, and the reflector is displaceably or swingably disposed on the fixing plate. And, the light-emitting cooling fan further includes at least one magnetic block secured on the reflector corresponding to the electromagnet such that when the electromagnet is powered, an attraction or repulsion is created between the electromagnet and the magnetic block to have the reflector displaced or swung with respect to the light guiding member.

The light-emitting cooling fan includes a transparent sheet mounted on the hub of the impeller. The reflector is a reflective layer; the light guiding member is a light guiding rod. The transparent sheet has a recess corresponding to the light source. The recess has its side and bottom wall surfaces coated with a reflective material to form the reflective layer for reflecting the light from the light source. The light guiding rod is shaped and formed a part of the transparent sheet, and extends from the recess in a radial direction of the transparent sheet. The light guiding rod has at its front an incident surface facing the reflective layer, and at its rear an exit surface facing outside of the transparent sheet such that the light reflected by the reflective layer enters the incident surface of the light guiding rod and finally exits the exit surface of the light guiding rod.

All surfaces of the transparent sheet are coated with a light blocking material to form a light blocking layer, except the side and bottom wall surfaces of the recess and the incident surface and the exit surfaces of the light guiding rod in the transparent sheet. Besides, the reflector is movably with respect to the light guiding member.

The foregoing and other objectives, features, and advantages of the invention will be more readily understood upon consideration of the following detailed description of the invention, taken in conjunction with the accompanying drawings.

DETAILED DESCRIPTION OF EMBODIMENTS

Figure 1:
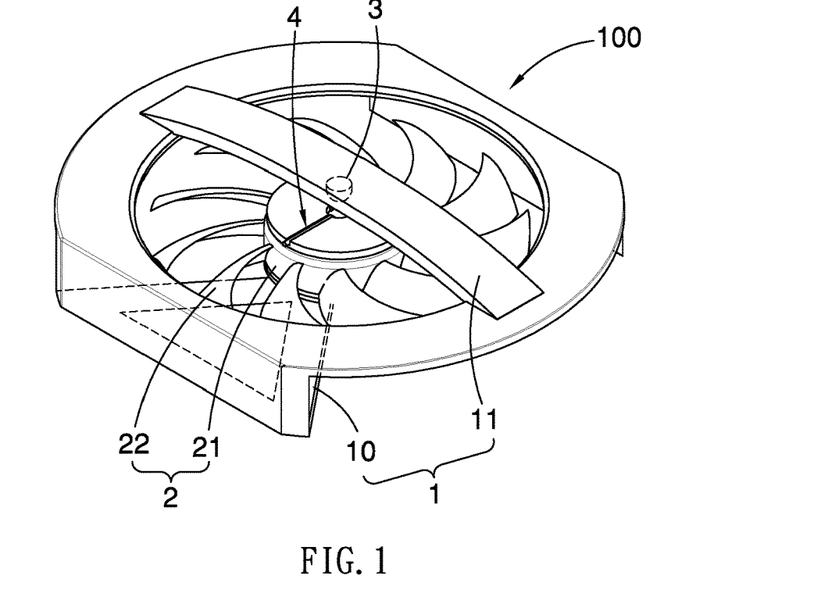
FIG. 1 is a perspective view of a light-emitting cooling fan in accordance with the preferred embodiment of the present invention.

Referring to FIG. 1, there is shown a preferred embodiment of the light-emitting cooling fan 100 with a hybrid of light-reflective and light-guiding mechanisms, which generally includes a holder 1, an impeller 2 disposed on the holder 1, a light source 3 disposed on the holder 1, and a light guide module 4 disposed on the impeller 2. The holder 1 generally includes a base 10 and a bracket 11 arranged above the base 10. While it is preferable that the base 10 and the bracket 11 are integrally formed in one piece to form the holder 1, those of skill in the art will appreciate from this disclosure that the holder 1 can be formed using discrete parts that are either fastened or welded together without departing from the scope of the present invention.

The impeller 2 is located in between the base 10 and the bracket 11, and is rotatably mounted on the base 10. The impeller 2 may be a conventional impeller used in a computer fan, which includes a hub 21 and a plurality of fan blades 22 arranged around the hub 21. The light source 3 is disposed on the bracket 11 of the holder 1 and points downward to the hub 21 of the impeller 2 so as to project light toward the hub 21. Preferably, the light source 3 is directed to multicolor LEDs to form light of different colors.

Figure 2:
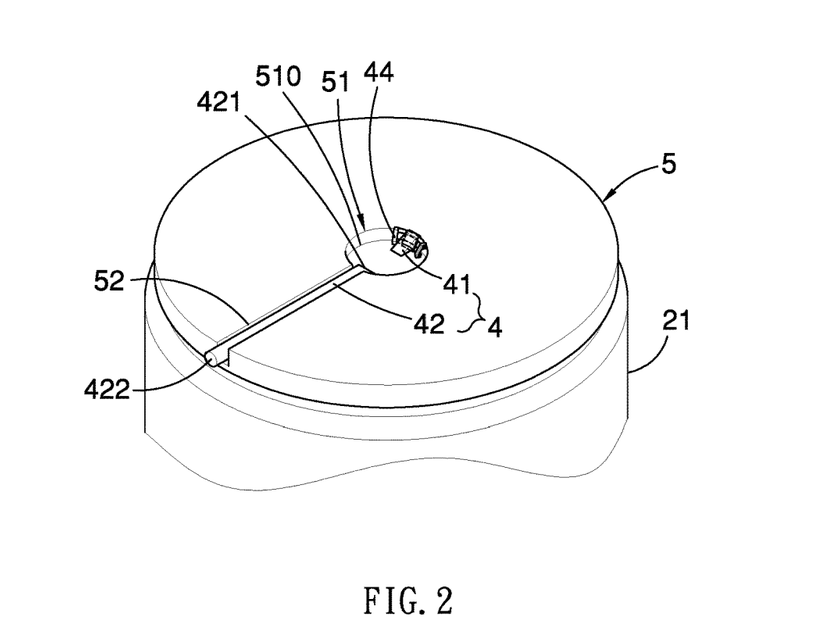
FIG. 2 is an enlarged perspective view of a light guide module of the light-emitting cooling fan shown in FIG. 1.
Figure 3:
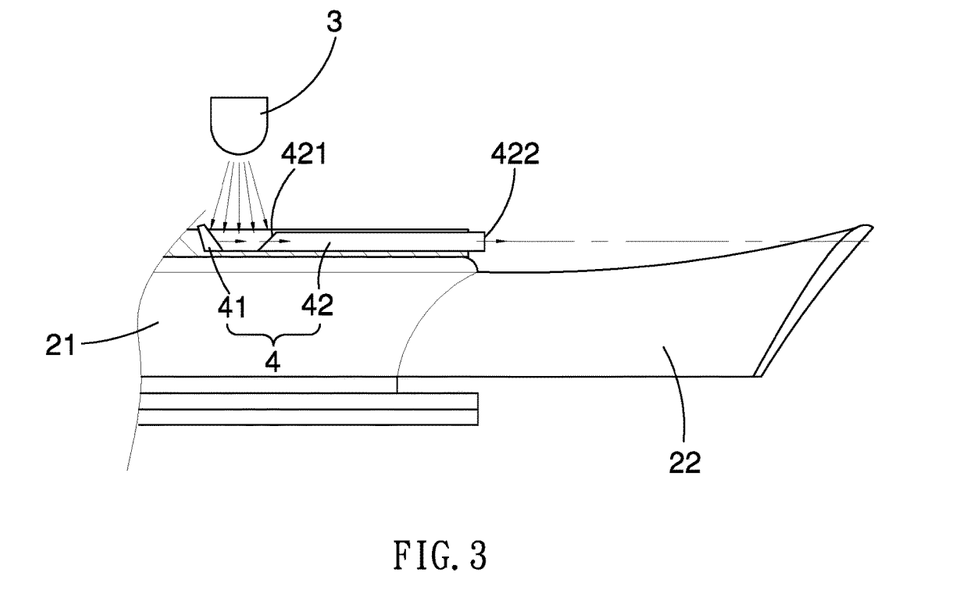
FIG. 3 is a side view, in partial cross-section, of the light guide module.

Please referring to FIGS. 2 and 3, the light guide module 4 is directed to the aforementioned hybrid of light-reflective and light-guiding mechanisms, and generally includes a reflector 41 and a light guiding member 42 both arranged on the hub 21 of the impeller 2 and underneath the light source 3. The reflector 41 is configured for reflecting light from the light source 3 in a radial direction of the hub 21 to the light guiding member 42. On the other hand, the light guiding member 42 is configured for receiving the light from the reflector 41 and leading the light to travel along the radial direction of the hub 21 to the outside of the hub 21 and finally hit one of the fan blades 22 of the impeller 2.

Figure 11:
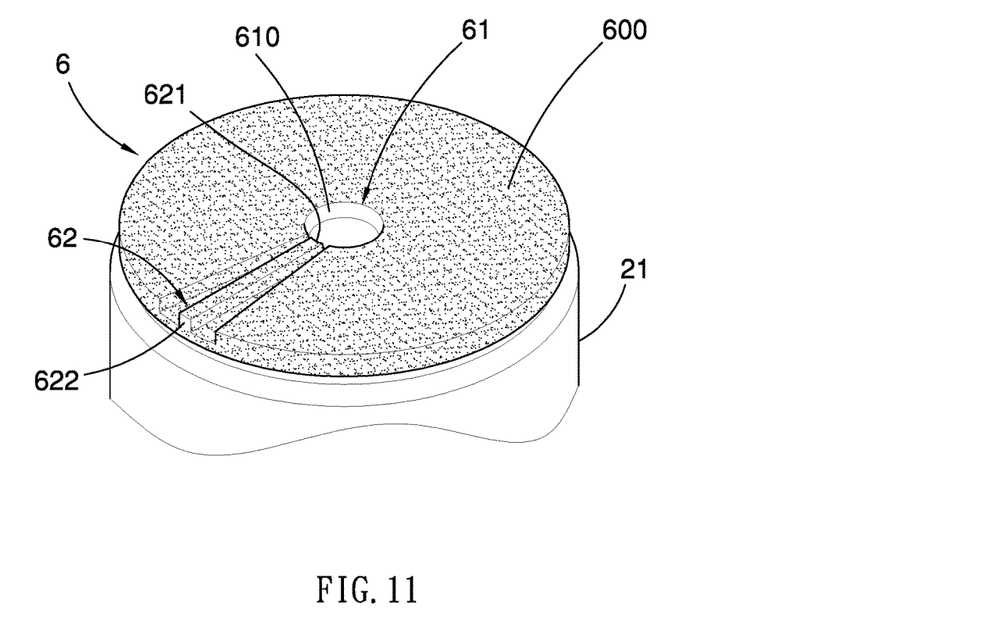
FIG. 11 shows another example of a light guide module.

As shown in FIG. 2, on the hub 21 of the impeller 2 is a fixing plate 5 on which the light guide module 4 is mounted. However, it should be appreciated that the light guide module 4 may be directly mounted on the hub 21 of the impeller 2 as well. In the illustrated embodiment, the fixing plate 5 is connected to the hub 21 by adhesive; however, they may be either fastened or welded together without departing from the scope of the present invention. More specifically, the fixing plate 5 has a central recess 51 and a groove 52. The central recess 51 of the fixing plate 5 is preferably round in shape, but other shapes, such as squares, rectangles, triangles, polygons, may be applied. The groove 52 is in communication with the central recess 51 and extends from the central recess 51 in the radial direction of the hub 21. Within the central recess 51 of the fixing plate 5 is the reflector 41 which may be a mirror or a reflective layer 610 as shown in FIG. 11, as will be discussed later. The light guiding member 42 is embedded in the groove 52, and has a front end 421 heading to the reflector 41 and a rear end 422 pointing to the outside of the fixing plate 5. Preferably, the front end 421 of the light guiding member 42 has a slope facing the reflector 41, and the light guiding member 42 may be a fiber optic light guide as in this example or a light guiding rod 62 as in another example shown in FIG. 11, as will be discussed later.

Referring to FIG. 3, some of light radiating from the light source 3 directly enters the front end 421 of the light guiding member 42 while others of the light firstly hit the reflector 41, and then be reflected by the reflector 41 to the front end 421 of the light guiding member 42, and finally exits the rear end 422 of the light guiding member 42 in the radial direction of the fixing plate 5 or the hub 21 for projecting on one of the fan blades 22. In this manner, rotation of the light guide module 4 with the impeller 2 turns the projected light into a halo visual illusion in human eyes due to visual persistence.

Figure 4:
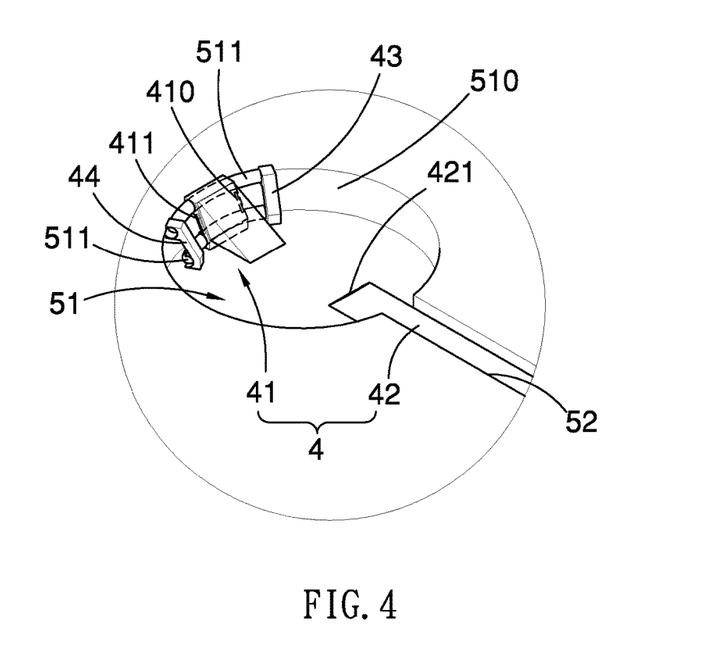
FIG. 4 is a further enlarged perspective view of the light guide module shown in FIG. 2.
Figure 5:
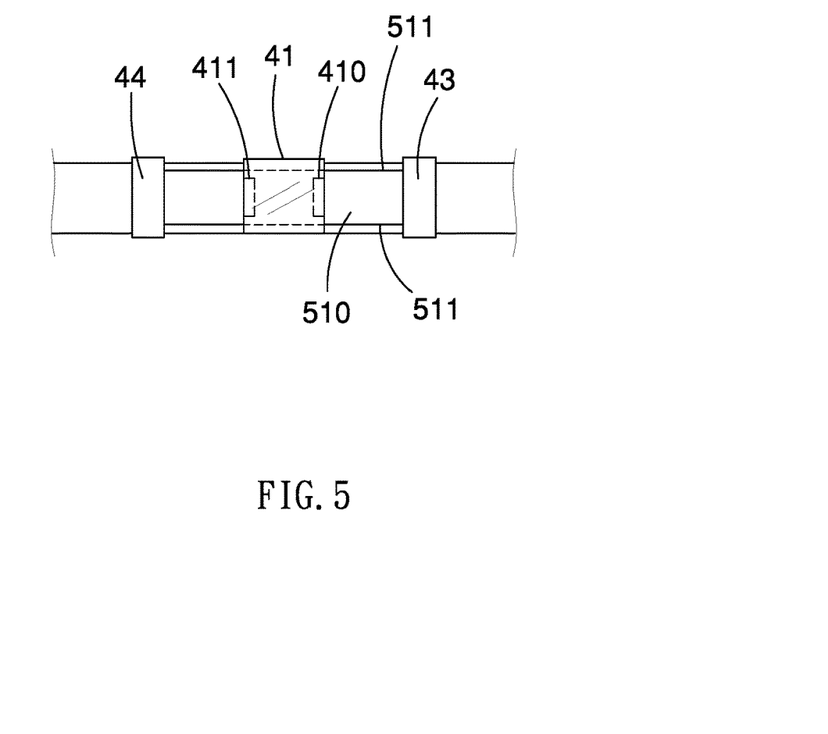
FIGS. 5 to 8 illustrate the movement of one example of reflector used in the light guide module.

As shown in FIGS. 2, 4 and 5, the light guide module 4 further includes two electromagnets 43, 44 secured on the fixing plate 5. The reflector 41 is displaceably disposed within the central recess 51 of the fixing plate 5. More specifically, a pair of parallel rails 510 are formed on an inner wall 510 of the central recess 51, as best seen in FIG. 4. The reflector 41 is slidably disposed on the pair of the rails 511. The two electromagnets 43, 44 are secured on the inner wall 510 of the central recess 51 and are respectively located at opposite sides of the reflector 41. Besides, the light guide module 4 further includes two magnetic block 410, 411 attached to opposite side walls of the reflector 41 corresponding to the two electromagnets 43, 44. In the illustrate embodiment, there are two electromagnets 43, 44 and two magnetic blocks 410, 411 employed in the light guide module 4. However, it will be appreciated that other assembly configurations could be utilized, with different numbers of electromagnets and magnetic blocks, including a set of one electromagnet and one magnetic block, for instance.

Figure 6:
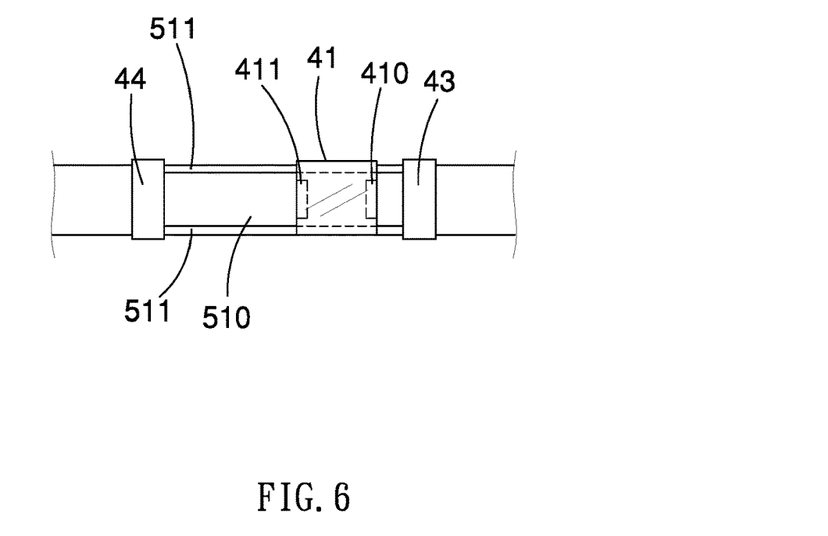
Figure 7:
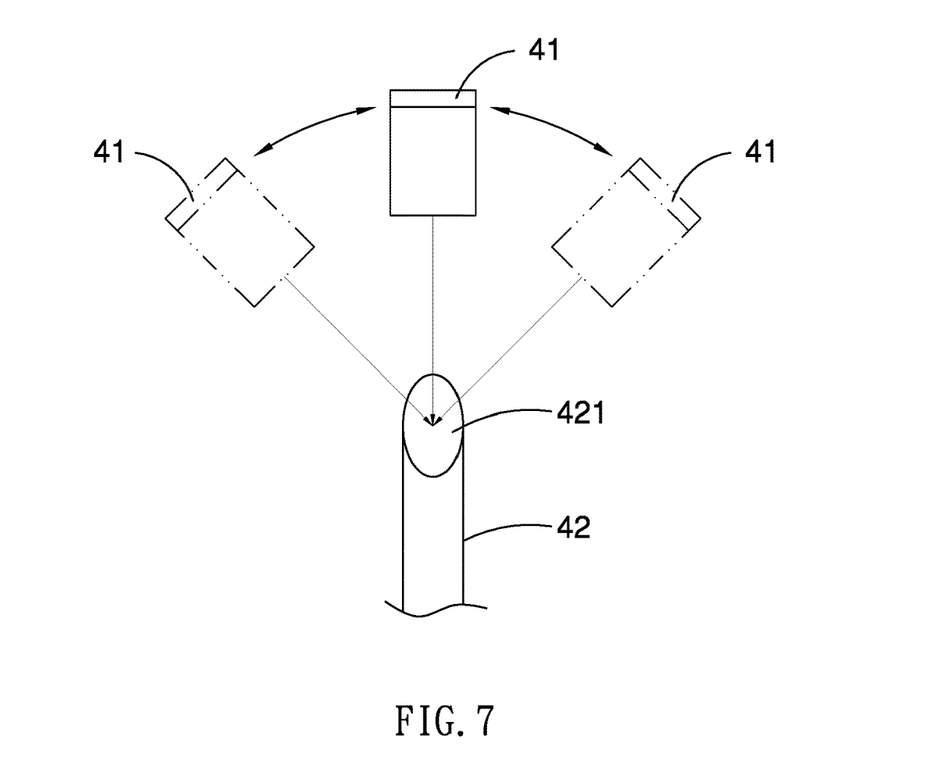

Once the electromagnet 43 is powered, an attraction is generated between the electromagnet 43 and the magnetic block 410 to have the reflector 41 move from an original position where the reflector 41 is exactly facing the front end 421 of the light guiding member 42, as shown in FIGS. 2 to 5, to a right-side position closer to the electromagnet 43, as shown in FIG. 6 as well as in the dotted lines in the right hand side of FIG. 7. When the reflector 41 is off the original position, the reflector 41 is no more exactly facing the front end 421 of the light guiding member 42, and the amount of the light reflected by the reflector 41 and entering the light guiding member 42 is relatively less. As a result, the light output from the light guiding member 42 becomes weak.

Figure 8:
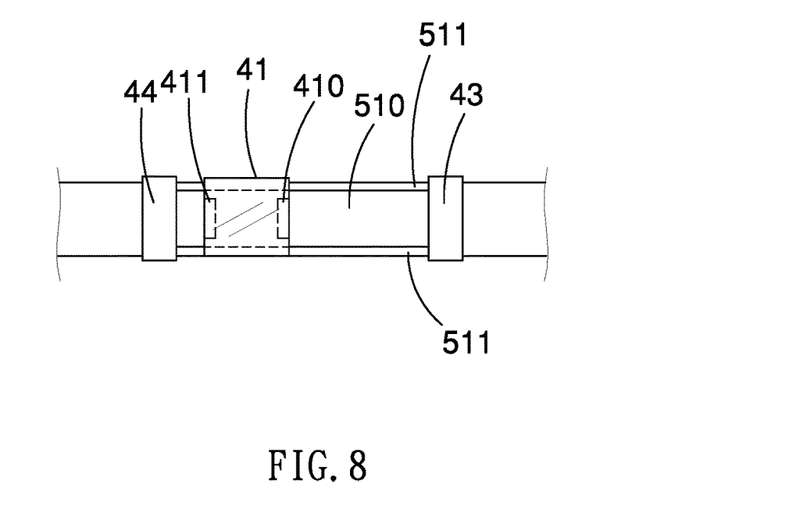

On the contrary, when the other electromagnet 44 is powered, a repulsion is generated between the electromagnet 44 and the magnetic block 411 to have the reflector 41 move from the right-side position back to the original position. Alternatively, a repulsion may be generated between the electromagnet 43 and the magnetic block 410 by altering a current direction of the electromagnet 43, for returning the reflector 41 back to its original position. In either case, since the reflector 41 is returned back to its original position, more light can be reflected by the reflector 41 and the light output from the light guiding member 42 become stronger. Likewise, either one of the electromagnets 43, 44 can be controlled to move the reflector 41 from the original position to a left-side position closer to the other electromagnet 44, as shown in FIG. 8 as well as in the dotted lines in the left hand side of FIG. 7. Moreover, a distance that the reflector 41 travels can be previously controlled by changing the power applied to the electromagnet 43 or 44, as discussed in detail in Taiwan Pat. No. M500821.

As described above, the reflector 41 and the light guiding member 42 can be moved with respect to each other in order to adjust the amount of light being reflected by the reflector 41 and entering the light guiding member 42, whereby the amount of the light output from the light guiding member 42 can be well controlled.

Figure 9:
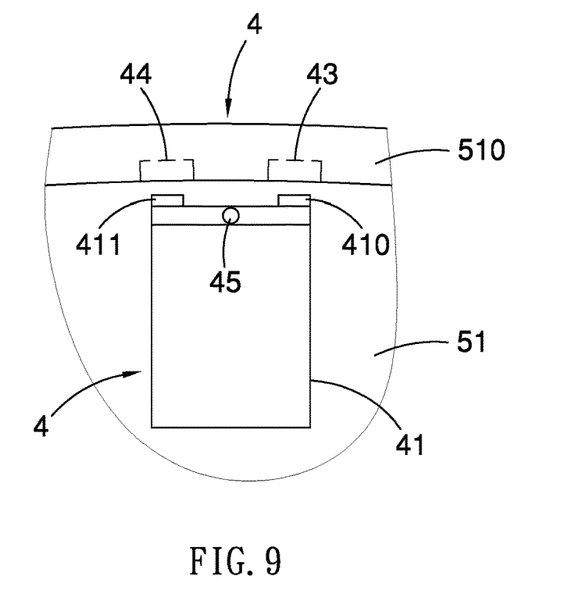
FIGS. 9 and 10 illustrate the movement of another example of reflector used in the light guide module.
Figure 10:
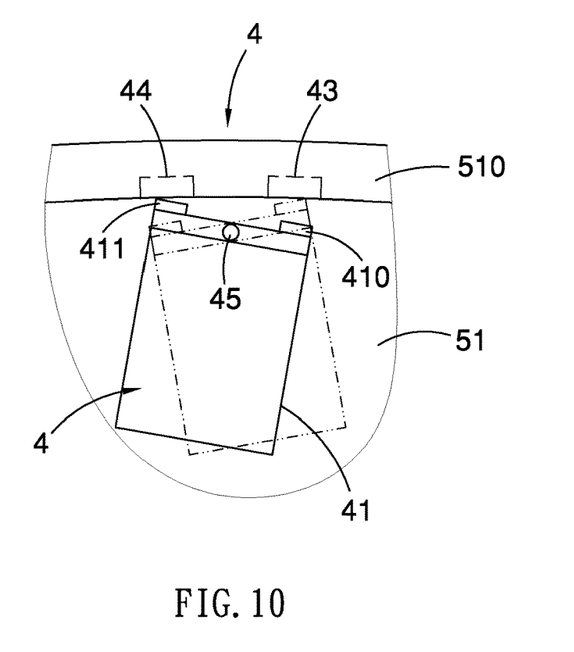

FIG. 9 illustrates another example of the light guide module 4. In this example, the reflector 41 is disposed within the central recess 51 and is pivoted to a pivot pin 45 such that the reflector 41 is swingable within the central recess 51 about the pivot pin 45, as shown in FIG. 10. Furthermore, the reflector 41 has a front, reflective surface (not numbered) facing the front end 421 of the light guiding member 42. The two magnetic blocks 410, 411 are attached to the rear surface of the reflector 41 and at opposite sides of the pivot pin 45 respectively. The two electromagnets 43, 44 are mounted on the inner wall 510 corresponding to the two magnetic blocks 410, 411. In this manner, either one of the electromagnets 43, 44 can be controlled to have the reflector 41 swing from the original position where the reflector 41 facing the front end 421 of the light guiding member 42, as shown in FIG. 9, to a tilted position where the reflector 41 is no longer completely facing the front end 421 of the light guiding member 42, as shown in FIG. 10. Thus, the amount of the light reflected by the reflector 41 is relatively less, and the light output from the light guiding member 42 becomes weak. On the contrary, once the reflector 41 is swung back to its original position, the amount of the light reflected by the reflector 41 will become relatively more, and the light output from the light guiding member 42 will become strong.

As described above, the reflector 41 may be arranged in various ways in the light guide module 4. For example, the reflector 41 may be immovable in one example or be movable (displaceable or swingable) under a proper control in other example. If the reflector 41 is movable, the position of the reflector 41 may be adjusted in order to alter the amount of light output from the light guiding member 42.

FIG. 11 illustrates another example of a light guide module (not numbered) which includes a transparent sheet 6 mounted on top of the hub 21 of the impeller 2. The transparent sheet 6 is similar to the aforementioned fixing plate 5 in shape and in structure, and may be made from acrylic plastic. Moreover, the transparent sheet 6 has a central recess 61 and the aforementioned light guiding rod 62. The central recess 61 of the transparent sheet 6 is located corresponding to the light source 3. The light guiding rod 62 is shaped and formed a part of the transparent sheet 6, and extends from the central recess 61 in a radial direction of the transparent sheet 6 or the hub 21. The light guiding rod 62 has at its front an incident surface 621 facing the central recess 61, and at its rear an exit surface 622 facing the outside of the transparent sheet 6. In particular, the central recess 61 has its side and bottom wall surfaces coated with a reflective material to form a reflective layer 610 which serves as the reflector 41 for reflecting the light radiating from the light source 3. Besides, all surfaces of the transparent sheet 6, except the side and bottom wall surfaces of the central recess 61 and the incident surface 621 and the exit surface 622 of the light guiding rod 62 in the transparent sheet 6, are coated with a light blocking material to form a light blocking layer 600. Due to the light blocking layer 600, the light guiding rod 62 functions as a fiber optic light guide and serves as a light guiding member 42 such that the light reflected by the reflective layer 610 enters the incident surface 621 of the light guiding rod 62 and finally exits the exit surface 622 of the light guiding rod 62. More specifically, once the light travelling in the light guiding member 42 hits the light blocking layer 600, the light will be reflected by the light blocking layer 600 and be trapped back to the light guiding member 42 from escape.

Figure 12:
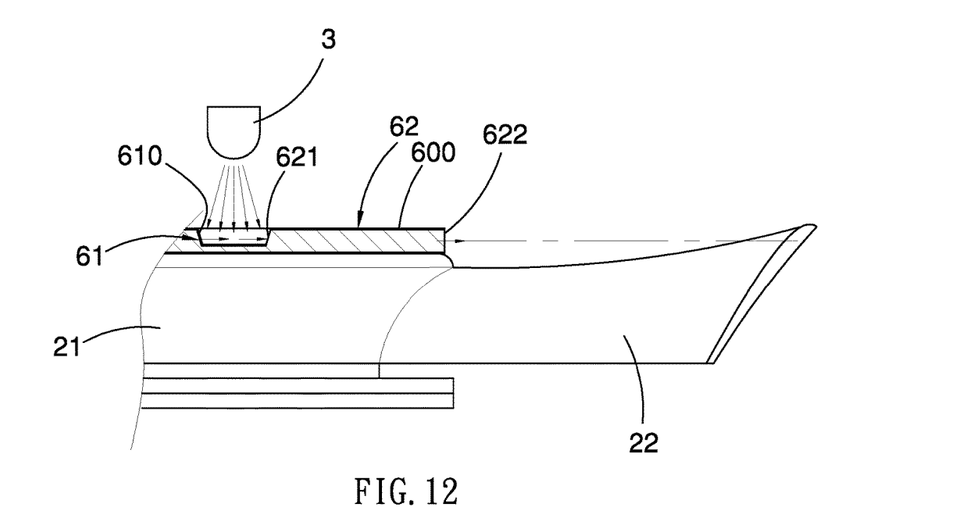
FIG. 12 is a side view, in partial cross-section, of the light guide module.

As shown in FIG. 12, some of the light radiating from the light source 3 directly enter the incident surface 621 of the light guiding rod 62 while others may firstly hit the reflective layer 610 and then be reflected by the reflective layer 610 to the incident surface 621 of the light guiding rod 62. Therefore, all the light entering the incident surface 621 of the light guiding rod 62 will travel along the radial direction of the hub 21 and project to the outside under the guidance of the light guiding rod 62. In this way, during the rotation of the light guide module with the impeller 2, the projected light from the light guiding rod 62 creates a halo visual illusion in human eyes due to visual persistence.

Figure 13:
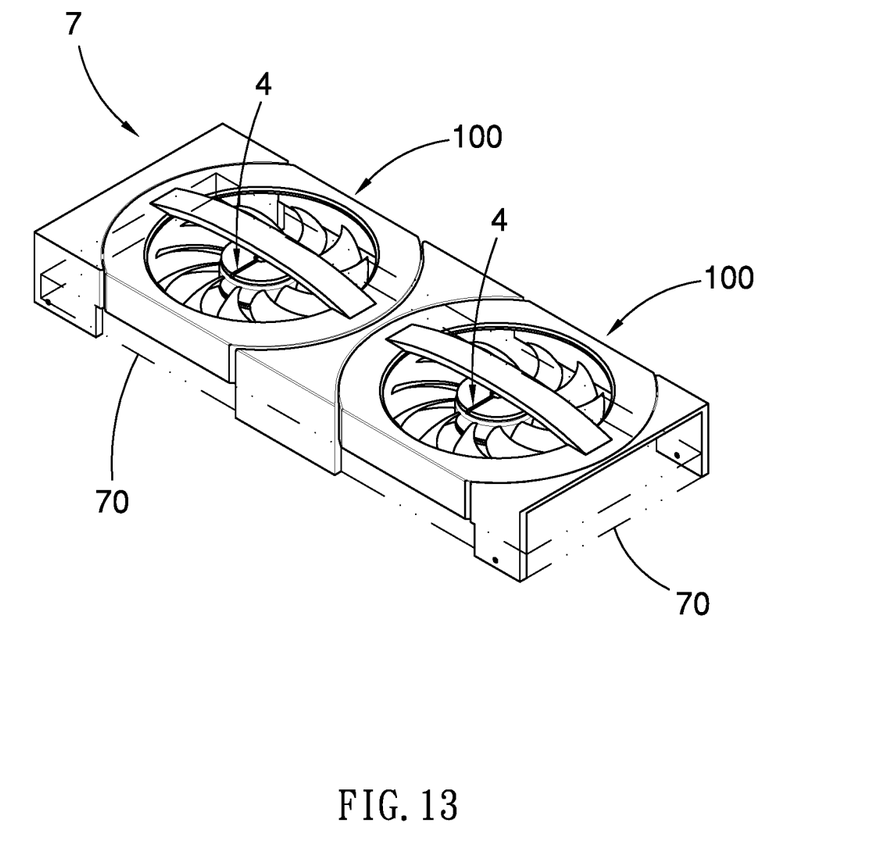
FIG. 13 is a perspective view of a computer fan equipped with two light-emitting cooling fans of the present invention.

FIG. 13 illustrates a computer fan 7 equipped with two light-emitting cooling fans 100 of the present invention as well as a heat sink 70. In this way, the computer fan 7 provides not only cooling effects but also the visual illusion effects.

As described above, with the reflection and guidance of the light guide module 4, the light radiating from the light source 3 can be projected along a radial direction of the hub 21 to form a beam of light. In particular, rotation of the impeller 2 transfers this light beam into a halo visual illusion for human eyes. Moreover, the reflector 41 of the light guide module 4 may also be controlled to shift positions in order to adjust the amount of light being reflected to the light guiding member 42, thereby adjusting the intensity of the light output from the light guiding member 42. As such, the light-emitting cooling fan of the present invention employs a brand new design of a hybrid of light-reflective and light-guiding mechanisms, offering more options for customers.

What is claimed is:

1. A light-emitting cooling fan, comprising:
    a base;
    a bracket arranged above the base;
    an impeller located in between the base and the bracket, rotatably mounted on the base, and having a hub and a plurality of fan blades arranged around the hub;
    a light source disposed on the bracket and pointing downward to the hub of the impeller;
    a reflector disposed on the hub of the impeller and underneath the light source, and configured for reflecting light from the light source in a radial direction of the hub; and
    a light guiding member, disposed on the hub and underneath the light source, and configured for receiving the light from the reflector and leading the light to travel along the radial direction of the hub to outside of the hub and then hit one of the fan blades of the impeller.

2. The light-emitting cooling fan as recited in claim 1, further comprising a fixing plate mounted on the hub of the impeller, wherein the fixing plate has a recess and a groove being in communication with the recess and extending from the recess in a radial direction of the fixing plate; the reflector is disposed within the recess; the light guiding member is embedded in the groove and has a front end heading to the reflector and a rear end pointing to outside of the fixing plate such that the reflected light from the reflector enters the front end of the light guiding member, and finally exits the rear end of the light guiding member in the radial direction of hub.

3. The light-emitting cooling fan as recited in claim 1, wherein the reflector is a mirror while the light guiding member is a fiber optic light guide.

4. The light-emitting cooling fan as recited in claim 2, further comprising at least one electromagnet secured on the fixing plate, and the reflector is displaceably or swingably disposed on the fixing plate.

5. The light-emitting cooling fan as recited in claim 4, further comprising at least one magnetic block secured on the reflector corresponding to the electromagnet such that when the electromagnet is powered, an attraction or repulsion is created between the electromagnet and the magnetic block to have the reflector displaced or swung with respect to the light guiding member.

6. The light-emitting cooling fan as recited in claim 1, further comprising a transparent sheet mounted on the hub of the impeller, wherein the reflector is a reflective layer; the light guiding member is a light guiding rod; and wherein the transparent sheet has a recess corresponding to the light source; the recess has its side and bottom wall surfaces coated with a reflective material to form the reflective layer for reflecting the light from the light source; the light guiding rod is shaped and formed a part of the transparent sheet, and extends from the recess in a radial direction of the transparent sheet; the light guiding rod has at its front an incident surface facing the reflective layer, and at its rear an exit surface facing outside of the transparent sheet such that the light reflected by the reflective layer enters the incident surface of the light guiding rod and finally exits the exit surface of the light guiding rod.

7. The light-emitting cooling fan as recited in claim 6, wherein all surfaces of the transparent sheet are coated with a light blocking material to form a light blocking layer, except the side and bottom wall surfaces of the recess and the incident surface and the exit surfaces of the light guiding rod in the transparent sheet.

8. The light-emitting cooling fan as recited in claim 1, wherein the reflector is movable with respect to the light guiding member.

\* \* \* \* \*